March 4, 1952  D. J. J. FEDERICO  2,588,100
AUTOMATIC ELECTRIC TOASTER
Filed Jan. 28, 1948  3 Sheets-Sheet 1
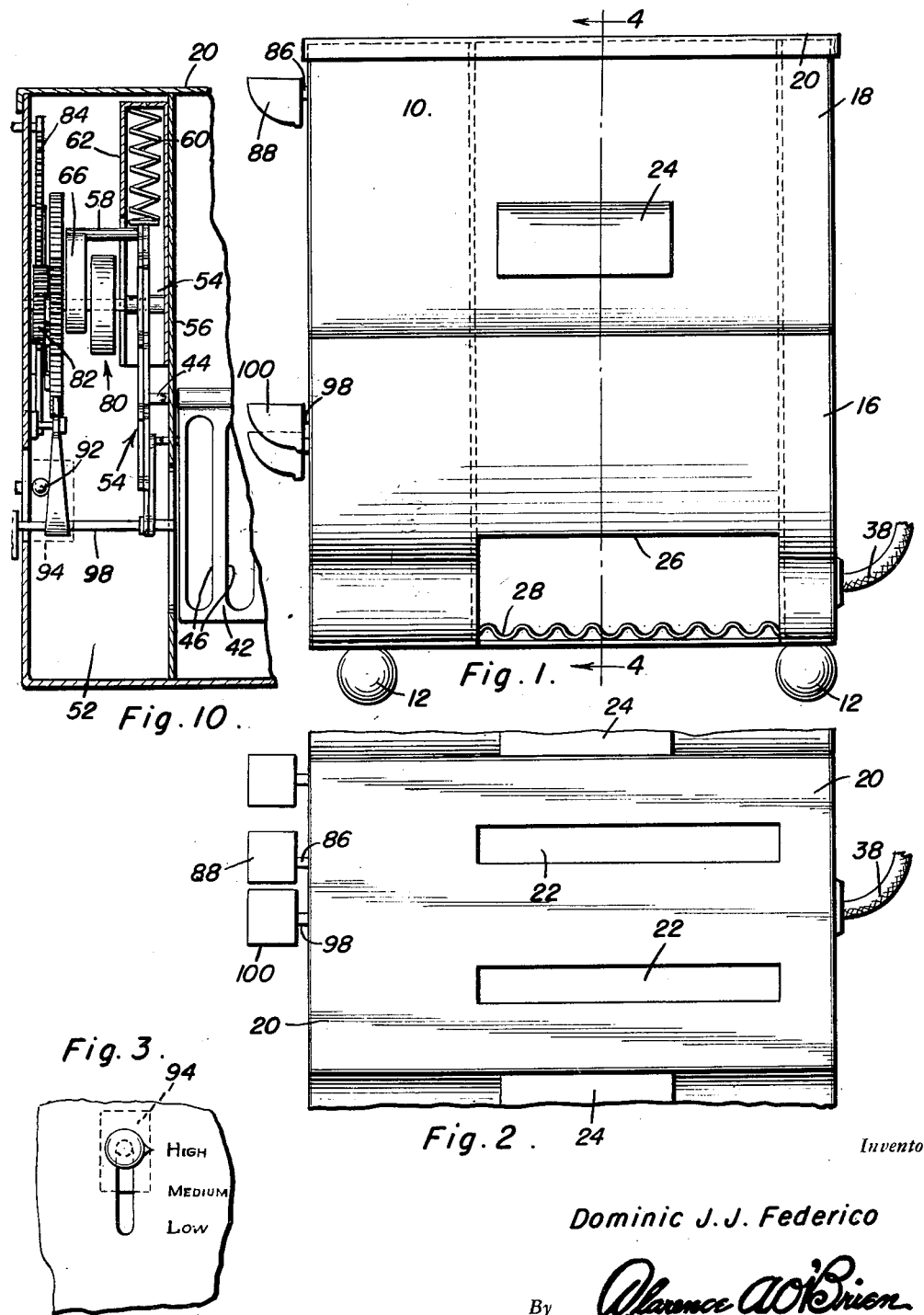
Inventor
Dominic J. J. Federico
By Clarence A. O'Brien
and Harvey B. Jacobson
Attorneys March 4, 1952     D. J. J. FEDERICO     2,588,100
AUTOMATIC ELECTRIC TOASTER
Filed Jan. 28, 1948     3 Sheets-Sheet 2
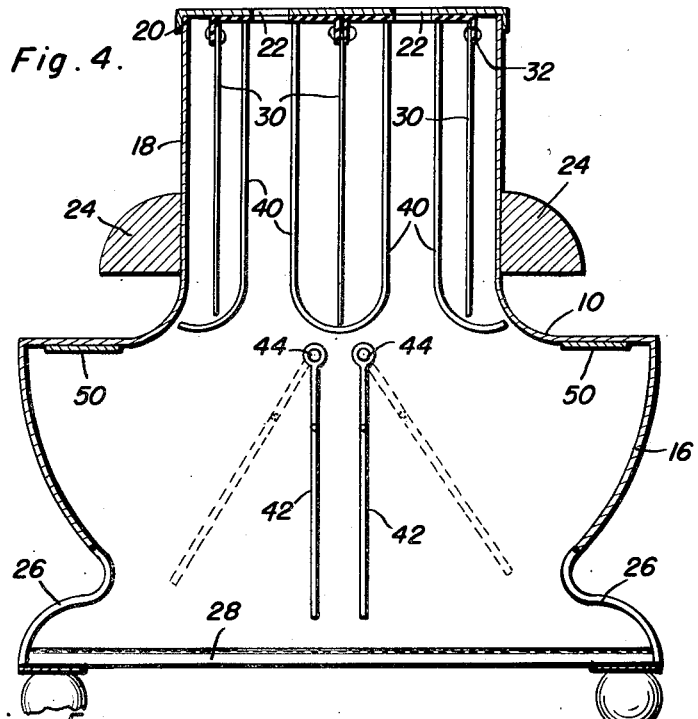
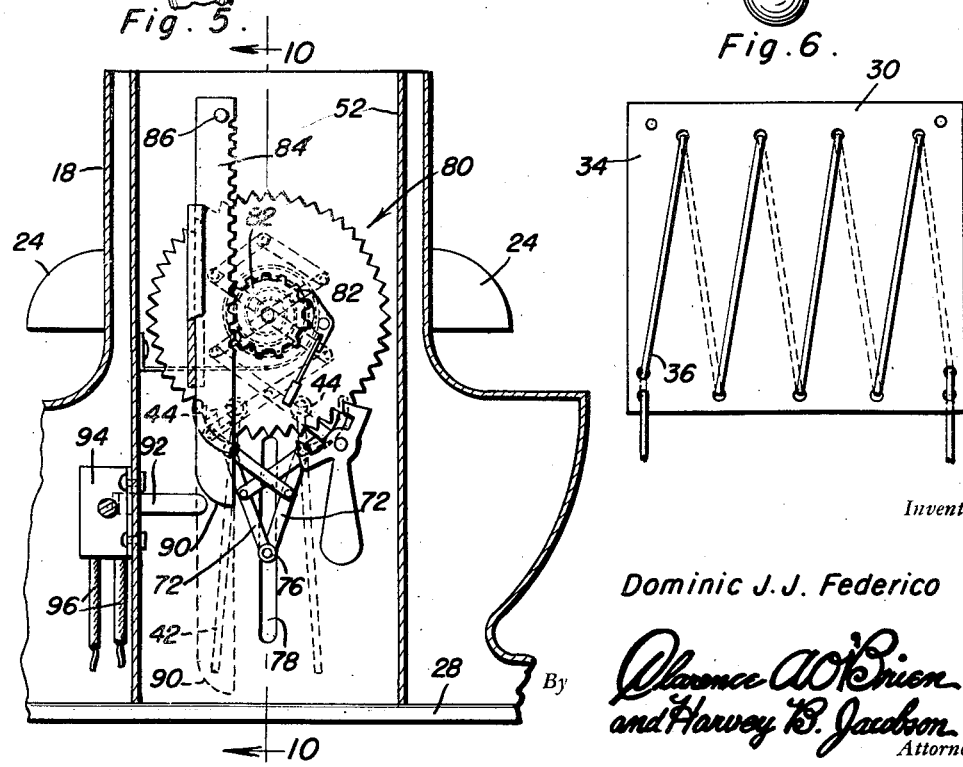
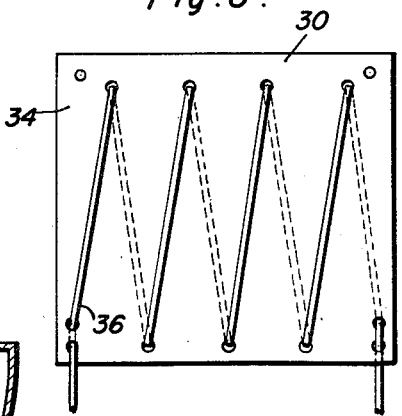
Inventor
Dominic J. J. Federico March 4, 1952  D. J. J. FEDERICO  2,588,100
AUTOMATIC ELECTRIC TOASTER
Filed Jan. 28, 1948  3 Sheets-Sheet 3
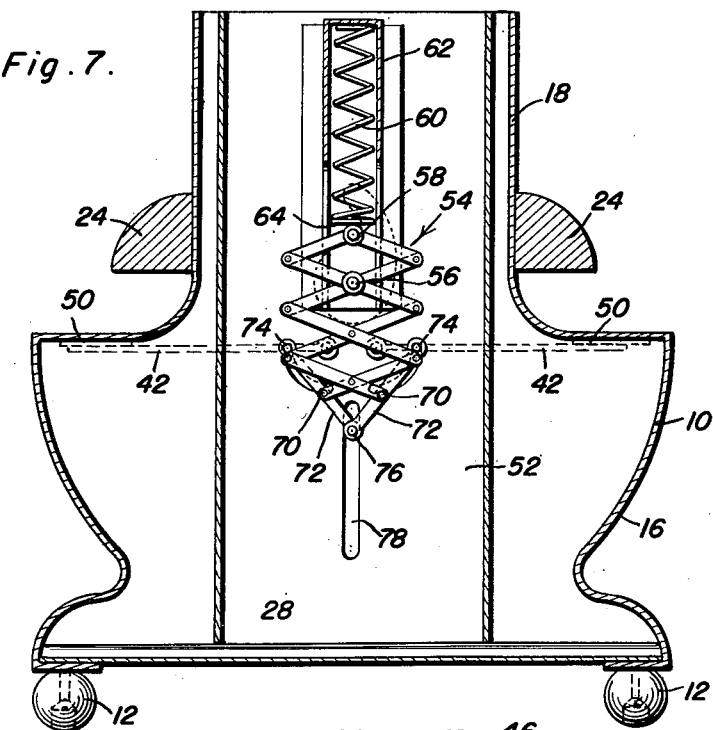
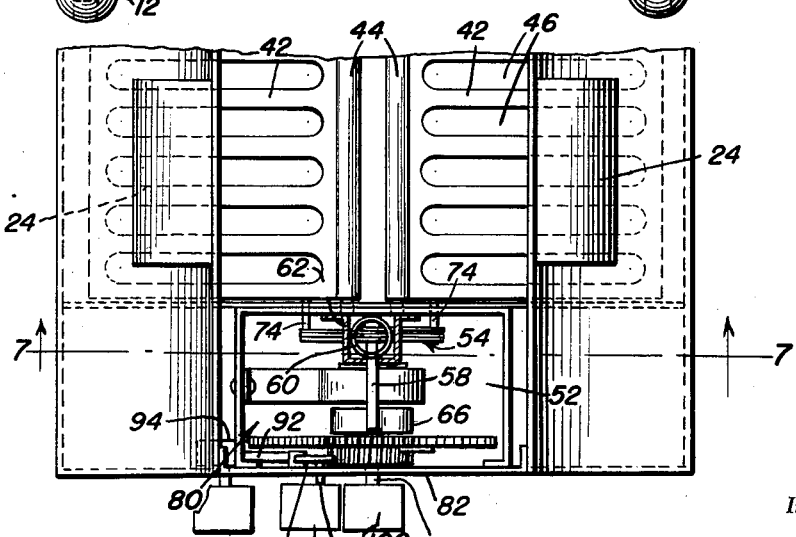
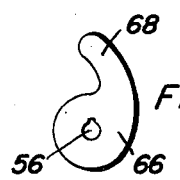
Inventor
Dominic J. J. Federico Patented Mar. 4, 1952

2,588,100

UNITED STATES PATENT OFFICE 2,588,100

AUTOMATIC ELECTRIC TOASTER

Dominic J. J. Federico, Easton, Pa.

Application January 28, 1948, Serial No. 4,828

4 Claims. (Cl. 99—327)

This invention comprises novel and useful improvements in an automatic electric toaster and more specifically pertains to a toaster which will automatically toast and eject bread and other food articles placed therein after a predetermined period of toasting.

The principal object of this invention is to provide an apparatus which will automatically toast bread or the like evenly and uniformly, and wherein the degree of toasting is automatically controlled and may be regulated in accordance with the desires of the operator.

A principal feature of the invention resides in the provision of one or more toasting chambers wherein the slices of bread pass between or are positioned between and adjacent to electric heating elements; and wherein the bottom of the bread chamber is hingedly opened to discharge the bread, when toasted, to the discharge orifices or doors of the device.

A still further feature of the invention resides in the provision of a resilient spring actuated lazytong arrangement for urging the doors of the toasting chamber into their closed position; together with time actuated mechanism for positively actuating the lazytongs for opening the doors to release the bread or other objects toasted.

A still further feature of the invention consists in the provision of an electric switch controlling the flow of current to the heating element which switch is controlled by and is synchronized with the position of means associated with the clock work mechanism.

And a final feature of the invention to be specifically enumerated herein resides in the provision of an apparatus in conformity with the foregoing objects and features wherein slices of bread are retained in proximity to the heating elements for a varying length of time; and wherein the period of actuation of heating elements may be varied as desired and is automatically controlled within predetermined variable limits by the clock work mechanism controlling the discharge of the toast from the device.

These, together with various ancillary objects of the invention which will later become apparent as the following description proceeds are attained by this device, the preferred embodiment of which is illustrated only by way of example in the accompanying drawings, wherein:

Figure 1 is a side elevational view of the device;

Figure 2 is a fragmentary top plan view of the device in Figure 1;

Figure 3 is a fragmentary end elevational view of the device showing the control switch of the heating element for regulating the degree to which the bread is to be toasted;

Figure 4 is a vertical transverse sectional view taken substantially from the plane of the sectional line 4—4 of Figure 1;

Figure 5 is a vertical transverse sectional view taken through a portion of the device showing the clock work controlling mechanism thereof;

Figure 6 is an elevational detail view showing one of the heating elements of the device;

Figure 7 is a vertical transverse sectional view through the device taken substantially from the plane of the section line 7—7 of Figure 8;

Figure 8 is a top plan view of the device, the cover or top thereof being removed to show the interior part thereof;

Figure 9 is a detailed elevational view showing an operating hand forming a part of the device; and, Figure 10 is a vertical sectional view taken substantially from the plane of the section line 10—10 of Figure 5 and showing further constructional details of the device.

Referring now more specifically to the accompanying drawings, wherein like numerals designate some of the parts throughout the various views, 10 designates the casing or housing of the toaster which may be of any suitable shape, and material, what is preferrably formed of light weight sheet metal or the like, having a hollow interior and being mounted upon suitable supporting legs indicated at 12.

The body 10 includes a hollow base portion 16 of any convenient shape, from which preferrably rises an integrally and upwardly extending portion 18, to which is detachably secured a cover plate 20. The latter, as shown in Figures 2 and 4, is provided with one or more slots 22 constituting openings for admitting a slice of bread or the like to the interior of the toaster to be heated therein as set forth hereinafter.

Secured to the side of the portion 18, are a pair of handles 24 of any suitable type for transporting the device as occasion dictates. Opening through the sides of the body, are a plurality of discharge openings 26, each of which is adapted to be placed in communication with one of the chambers for toasting articles, as setforth hereinafter.

As shown best in Figures 1 and 4, a sheet of corrugated material 28 is positioned within the hollow body 16 below the toasting chambers and underlying the discharge openings 26, for the purpose of receiving any crumbs or other matter falling downwardly from the heating chamber, this corrugated member constituting a collection chamber which may be readily emptied through the discharge openings 26 as designed.

Secured within the hollow portion 18 of the toaster, in any desired manner, such as by nuts, bolts, rivets or the like, are a plurality of heating elements 30 arranged in pairs upon each side of the slots 22.

As shown best in Figure 4, each of these heating elements 30 is carried by insulation member 32 secured to the interior and upper portion of the body portion 18 in a desired manner, each of these heating elements as shown best in Figure 6 including an insulation plate of any suitable material, as indicated at 34, a high resistant electrical heating wire 36 being conveniently carried by the plates 34. The connections of the heating wires 36 to a source of current are not shown, since these may be of any known conventional design, and in themselves form no part of the invention, a cable 38 being indicated as supplying current into the interior of the toaster and associated mechanism.

A series of curved wire guards or grill members 40 are positioned in any suitable manner inside the body portion 18, and are so located as to enclose and shield the heating element 30 from contact by a piece of bread inserted through the slot 22.

It will thus be seen that each of the slots 22 forms a toasting chamber of which the walls are composed of wire guard or grill members 40, and as shown in Figures 4 and 7, the bottoms of these chambers consist of plate members 42 hingedly mounted at the upper end of the hollow chamber in the base portion 16, as at 44. As will be readily seen by reference to Figure 8, the hinged bottom members or plates 42 have their inner edges rolled over to form a bead type of hinge 44 which embrace the longitudinally extending hinge pins 44 suitably mounted in the base portion 16.

Preferably, these bottom plates are provided with a series of slots 46 or other suitable openings for the purpose of lightening their weight as well as to permit the dropping of crumbs or other matter from the toasted slices of bread into the lower portion of the base and upon the corrugated collecting surface 28.

In substantially the same horizontal plane as the hinges 44 of the oscillatable bottom plate, are a pair of abutment stops 50 formed on the under surface of the top of the base member 16, which serve to limit the upward or closing movement of the bottom plate 42, as shown in dotted lines in Figure 7. The fully opened position of the swinging bottom members is indicated in full lines in Figure 4, while the dotted lines showing in Figure 4 indicate the open position of the bottom member for discharging toasted slices of bread from the heating chambers through the discharge openings 26. A mechanism for operating the swinging bottom members forms the essential features of this invention and will now be described in greater detail.

As shown best in Figure 8, at one end of the toaster body there is provided a vertical compartment 52 within which is housed a mechanism for operating toaster bottom plates, and a mechanism for regulating the time of operation of the operating mechanism.

As shown best in Figure 7, a series of links are connected to form a lazytong indicated generally at 54, this lazytong comprising a plurality of links pivotally connected intermediate their ends and at their extremities whereby relative longitudinal movement of the links will result in a lateral movement of their pivoted extremities. One of the intermediate pivots of the lazytong arrangement such as that indicated at 56, is composed of an axle which is suitably journalled in the body of the toaster, and represents a rotatable but relatively stationary pivot of the lazytong arrangement. The upper extremities of the lazytong links are connected to an axle 58 which in turn is engaged by a spring means such as the coiled spring 60 received in a guide cylinder 62 whose upper end is closed and constitutes an abutment for the spring, this guide cylinder 62 being indicated in Figure 8 as rigidly carried by an interior wall of the vertical compartment 52. The lower end of this coil spring 60 rests directly upon the plate member 64 which is journalled upon the shaft 58.

Rigidly attached to the axle 56 is a cam, of any desired shape suitable for the purposes intended, this cam being indicated at 66 as shown in detail in Figure 9, whereby upon rotation of the shaft 56, the cam will engage and actuate the axle 58 against the pressure of the spring member 60. The cam 66 is provided with an actuating lobe 68 which is shaped to give the desired time actuation to the shaft 58, and thus operate the lazytongs about its fulcrum 56, to impart actuating movement to the lower extremity of the tongs as set forth hereinafter. The lower ends or extremities of the lazytongs are pivotally connected as at 70 to connecting rod 72 whose upper extremities are pivoted to the bottom plates 42 as at 74, and whose lower extremities are pivoted together by a pin 76 which is guided and slides in a vertical guide slot 78 formed in the walls of the compartment 52.

By reference to Figure 7, it will thus be understood that the spring means 60 urges the lazytongs into its collapsed position, whereby the ends 70 of the lazytongs urge the connecting arms or rods 72 into their uppermost position, thus causing the guiding end 76 to ride upwardly in the guide slot 78, and causing the bottom plates 42 to be elevated into their closed or upper position, being yieldingly biased against the abutment stops 50. When now the shaft 56 is rotated, at an appropriate time, depending upon the synchronization of the contour of the cam with the operating mechanism, the nose of the cam 68 will urge the axle 58 upwardly against the thrust of the spring 60, thereby extending the tongs, and causing the lower extremities thereof to ride downwardly in the guide slot 78, thereby drawing the connecting rods downwardly and together and pulling the bottom plates 42 into their open position as shown by the dotted lines and full lines of Figure 4. As soon as the nose 68 of the cam has passed beneath the shaft 58, the spring means 60 will again be effective to operate the lazytongs and cause the closing of the bottom plates 42.

A time controlled mechanism is provided for operating the cam, and thereby controlling the time opening of the bottom plate for discharging the toast as desired. This time mechanism includes a conventional clock work mechanism of any known type, indicated generally at 80, and whose construction forms no part of this invention. Accordingly, an explanation of the various parts of this known mechanism will serve no useful purpose in describing the present invention and is therefore omitted. However, this clock work mechanism includes a winding ratchet wheel 82, for energizing or winding the customary clock work spring, this winding ratchet being engaged by a rack bar 84 as shown in Figure 5. The upper end of the rack bar 84 is provided with a laterally extending operating pin 86 which extends through a suitable slot in the casing of the body member 10, which is provided with a finger grip portion 88 whereby the rack bar may be urged downwardly to wind the clock work mechanism. As will be readily understood, the rack bar is in constant mesh with the ratchet wheel 82, and the position of the rack bar is therefore synchronized with the movement of the clockwork mechanism. The rack bar may be pushed downwardly to wind the mechanism, and is slowly elevated as the mechanism, which is connected to the axle 56, rotates the latter and the cam 66 carried thereby. Thus, the vertical position of the rack bar is synchronized with and comprises an indicator for the position of the operating cam 66, and therefore is calibrated with the time of opening of the swinging bottom plates 42.

At its lower end, the rack bar 84 is provided with a rounded cam surface 90, see Figure 5, which engages the operating button 92 of a switch indicated at 94, which switch is mounted upon the exterior surface of the walls in compartment 52, and which switch controls as by electric cables 96, the flow of current to the heating element 30. The arrangement is such that the push button 92 of the switch actuates the switch to its closing position energizing the heating elements 30, when the rack bar 84 is depressed for a predetermined downward distance; and the switch is allowed to open when the rack bar has been raised above a predetermined position. Thus, when the clockwork mechanism has been started by depressing the rack bar 84 and winding the clock work mechanism, the heating coils are energized, and remain energized until a sufficient time interval has elapsed, as controlled by the movement of the clock work mechanism and the rack bar has thereby been elevated a sufficient distance to release the switch and disengage the same. However, the movement of the cam 90 on the rack bar is so timed relative to the position of the cam 66 on the shaft 56, that the heating switch is cut off before the bottom plate 42 opens to permit discharge of the toast from the device.

It will thus be observed that a slice of bread when placed within the heating chambers is maintained therein for a constant length of time after the rack bar 84 is depressed; and that after this predetermined time interval, the doors 42 are opened and the slice of bread is discharged from the device as set forth hereinbefore. In order to vary the degree to which any slice of bread is toasted, the switch 94 is vertically adjustable of the walls of the compartment 52, to vary the vertical position of the actuating button 92 thereof relative to the cam 90 on the rack bar 84. It is suitably mounted for vertically adjusting and positioning the switch member, and the range of movement required to produce a low, medium or high degree of toasting is indicated in Figure 3. Thus, although the toast is maintained in the heating chamber a fixed time, yet the time during which the heat is applied thereto is variable by adjusting the switch member relative to the rack bar.

Since it sometimes becomes desirable to eject or release slices of bread from the toasting chamber prior to or independently of the operative of the automatic release caused by the clockwork control opening of the bottom gates, an emergency means is provided for opening the latter at any desired time. This means consists of a laterally extending rod 98, see Figures 1, 2, 8 and 10, which extends through a vertical slot in the end wall of the body member 10, and is provided with a finger grip portion 100 on the external end thereof. The inner end of the rod 98 is rigidly attached to one of the intermediate pivots of the lazytongs, whereby the latter may be manually urged downwardly, and the upper pivot 58 thereof urged manually upwardly against the opposition of the spring 60, this actuation of the lazytongs being permitted since during this movement the shaft 58 is raised from the operating cam 66. Since the lower end of the lazytongs is pivotally connected to the bottom plate 42, the latter are operated to their open position by this downward movement of the rod 98.

From the foregoing, it is believed that the manner of constructing and operating the device will be readily understood and accordingly further explanation is believed to be unnecessary. Since numerous modifications and equivalents will readily occur to those skilled in the art after a consideration of the foregoing specification and annexed drawings, it is not intended to limit the invention to the exact constructions shown and described, and that all suitable modifications and equivalents may be resorted to falling within the scope of the appended claims.

Having thus disclosed and described the invention, what is claimed as new is:

1. An electric toaster comprising a hollow body having electric heating elements therein, guards defining a chamber for positioning an object in proximity to said heating elements, a hinged bottom for said chamber, spring means biasing said bottom into its closed position, time controlled means including a clockwork mechanism for moving said hinged bottom to its discharging position, a manually operable rack bar for winding said clockwork mechanism, switch means movably adjustable relative to said rack bar for varying the time of actuation of said switch means relative to the time of movement of said hinged bottom to its discharging position, said switch means being controlled by said rack bar.

2. The combination of claim 1, wherein said switch means is maintained in circuit closing position by said rack bar, said switch means being adjustable longitudinally of said rack bar to vary the time of switch opening relative to the movement of said rack bar.

3. An electric toaster comprising a hollow body, means for toasting objects disposed in said body, a pair of sidewise aligned support members vertically pivotally attached to said body for supporting objects to be toasted in proximity to said toasting means, a lazytong assembly including a plurality of links and pivot pins connecting the links in each pair to each other intermediate their ends, a timer mechanism including a rotatable shaft secured to one of said pins, a cam on said shaft and engageable with the pin of the adjacent pair of links to positively urged said lazytong assembly into its extended position in response to rotation of said shaft, means for causing rotation of said cam, a pair of connecting rods each having one end thereof pivotally connected to a different one of said members, means pivotally connecting the other ends of said rods to each other, means operatively connecting said lazytong assembly to said rods, support means for said lazytong assembly.

4. The combination of claim 3, including means engaging said lazytong assembly and yieldingly biasing said assembly into its retracted position.

DOMINIC J. J. FEDERICO.

REFERENCES CITED

The following references are of record in the file of this patent:

UNITED STATES PATENTS

| Number | Name | Date |
|---|---|---|
| 1,529,342 | Christy | Mar. 10, 1925 |
| 1,836,538 | Lofgren et al. | Dec. 15, 1931 |
| 1,841,301 | Schroeder et al. | Jan. 12, 1932 |
| 1,852,398 | Bersted | Apr. 5, 1932 |
| 1,921,173 | St. Maur | Aug. 8, 1933 |
| 1,942,835 | Rutenber | Jan. 9, 1934 |
| 2,079,382 | Myers et al. | May 4, 1937 |
| 2,196,393 | Ireland | Apr. 9, 1940 |
| 2,244,039 | Ablah | June 3, 1941 |
| 2,262,297 | Olson | Nov. 11, 1941 |
| 2,361,078 | Anderson | Oct. 24, 1944 |
| 2,364,175 | Turner | Dec. 5, 1944 |
| 2,429,736 | Wales | Oct. 28, 1947 |
| 2,465,577 | Cox | Mar. 29, 1949 |